(No Model.)
G. A. HALL.
CUTTER BAR FOR MOWING MACHINES.
No. 536,695. Patented Apr. 2, 1895.
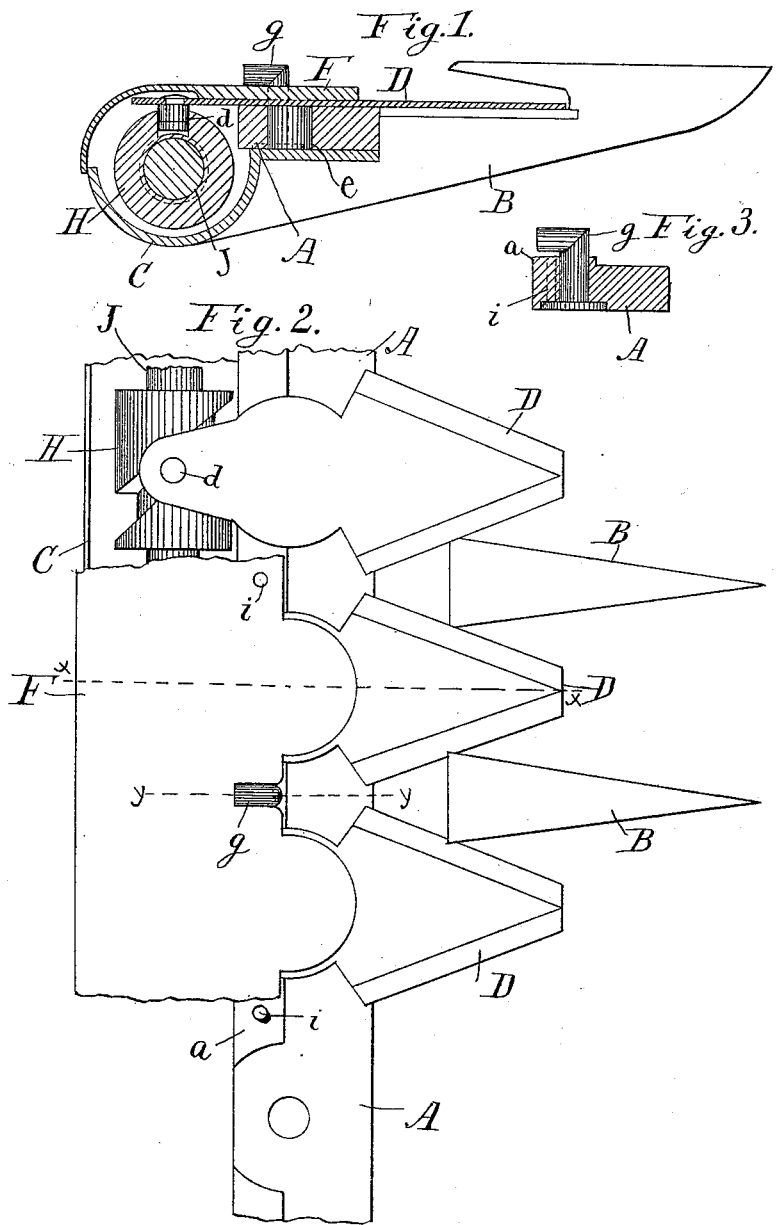

UNITED STATES PATENT OFFICE.

GEORGE A. HALL, OF DEERING, MAINE.

CUTTER-BAR FOR MOWING-MACHINES.

SPECIFICATION forming part of Letters Patent No. 536,695, dated April 2, 1895.

Application filed October 26, 1894. Serial No. 527,000. (No model.)

*To all whom it may concern:*

Be it known that I, GEORGE A. HALL, a citizen of the United States, residing at Deering, in the county of Cumberland and State of Maine, have invented certain new and useful Improvements in Cutter-Bars for Mowing-Machines; and I do hereby declare the following to be a full, clear, and exact description of the invention, such as will enable others skilled in the art to which it appertains to make and use the same.

My invention relates to that class of mowing machines and harvesters wherein the knives are pivoted to the cutter bar and reciprocated with a shearing motion by means of mechanism applied to their rear ends, sometimes in the form of a grooved cam in which runs a roll pivoted to the rear end of the knife and sometimes in the form of a pitman connected to the rear end of each knife. In this form of mowing machines as they have heretofore been constructed, much difficulty has been experienced in protecting the moving parts from the grass and dirt and particularly to prevent the grass from getting in between the knife and the finger bar and lifting it up or bending it. It has also been found in these machines that if any portion of the bar was raised above the level of the cutters that it would collect the grass and carry it along with the cutter bar thus retarding the machine and doing other damage.

My invention is directed to improving the construction of the cutter bar in the direction indicated and to forming a cutter bar which shall be smooth or flush on top in order that the grass may slide easily over it, which shall have the knives held in place by a fastening device which can be quickly applied, which is incapable of getting out of place and in which the working parts shall be covered and thoroughly protected.

In the accompanying drawings I have illustrated a cutter bar constructed according to my invention as I prefer to construct it.

In the drawings, Figure 1 is a section on the line $x\,x$ of Fig. 2. Fig. 2 is a top view of a portion of the cutter bar with parts cut away. Fig. 3 is a section on the line $y\,y$ of Fig. 2.

A represents the finger bar, B being the finger and C the rear extension thereof. The knives D are pivoted to the top of the finger bar and as I prefer to construct them they have a downward projecting stud $e$ on the under side fitting a bearing in the finger bar. The knives are made substantially straight and flat on top so that they may offer as little obstruction to the grass as possible. On the rear portion of the bar there is a bead or projection substantially the thickness of the knife projecting upward and this projection is cut away to the level of the bar where the knives are laid on. Thus the rear portion of the bar and the upper surface of the knives form substantially a continuous straight surface and on this surface fits the guard plate F forming a close joint. The guard plate is flat on top and the rear portion extends backward and downward over the rear ends of the knives.

The guard plate is secured to the finger bar by means of buttons $g$ each pivoted to the finger bar and having on its upper end a horizontal projection which is adapted to be turned backward over the forward edge of the guard plate. These buttons $g$ are placed at intervals along the cutter bar and keep the guard plate from lifting. It is prevented from lateral movement by pins $i$ which pass through the guard plate and through the finger bar.

The knives are reciprocated by means of the grooved cam H in the groove of which runs the anti-friction roll $d$ pivoted to the rear end of the knife. J is the cam shaft.

It will be seen that the cutter bar as thus constructed is simple and compact. It presents little or no obstruction to the grass to clog the knives. The guard plate serves the double purpose of a cover and a holding device to secure the knives in place and it may be easily and quickly removed by simply turning the button $g$ and lifting the plate off from the pins $i$. As the cutter bar passes through the grass the button $g$ will be continually forced backward into its holding position by the action of the grass so that the plate will never come off by the action of the machine.

I claim—

1. The herein described cutter bar for mowing machines consisting of a finger bar, knives having substantially straight upper surfaces journaled on the top of said finger bar and each having a rearward extension for reciprocating said knife, a guard plate resting over said knives and extending rearward to cover the rear portion thereof, pins in said finger bar fitting corresponding holes in said guard plate and a button pivoted to said finger bar having a horizontal projection on its upper end adapted to be turned rearward over the edge of said guard plate to hold it down.

2. The herein described cutter bar for mowing machines consisting of a finger bar having reciprocating knives pivoted on the upper surface thereof, the rear portion of said finger bar being provided with raised projections between said knives which come flush with their upper surface and a guard plate resting on said projection and extending over the tops of said knives and secured to said finger bar.

In testimony whereof I affix my signature in presence of two witnesses.

GEORGE A. HALL.

Witnesses:
S. W. BATES,
E. L. STANWOOD, Jr.